(12) United States Patent  
Hart (10) Patent No.: US 7,942,015 B2  
(45) Date of Patent: May 17, 2011

(54) WATER SUMP STRUCTURE (75) Inventor: Peter Leslie Hart, Near Bath (GB)

(73) Assignee: Formpave Holdings, Ltd., Cheltenham (GB)

( * ) Notice: Subject to any disclaimer, the term of this patent is extended or adjusted under 35 U.S.C. 154(b) by 1069 days.

(21) Appl. No.: 10/594,705

(22) PCT Filed: Jun. 7, 2005

(86) PCT No.: PCT/GB2005/002247  
§ 371 (c)(1),  
(2), (4) Date: Jan. 16, 2007

(87) PCT Pub. No.: WO2006/008433  
PCT Pub. Date: Jan. 26, 2006

(65) Prior Publication Data  
US 2007/0199341 A1  Aug. 30, 2007

(30) Foreign Application Priority Data

Jul. 20, 2004 (GB) .................................. 0416187.3  
Aug. 18, 2004 (GB) .................................. 0418391.9

(51) Int. Cl.  
*F25D 23/12* (2006.01)

(52) U.S. Cl. ........................................ 62/260; 62/324.1

(58) Field of Classification Search ............... 62/260, 62/324.1; 165/45  
See application file for complete search history.

(56) References Cited

U.S. PATENT DOCUMENTS

| 2,563,262 | A | * | 8/1951 | Moore | 126/344 |
| 3,563,304 | A | * | 2/1971 | McGrath | 165/240 |
| 4,378,908 | A | * | 4/1983 | Wood | 237/2 B |
| 4,392,531 | A | * | 7/1983 | Ippolito | 166/278 |
| 5,477,703 | A | | 12/1995 | Hanchar et al. | |

FOREIGN PATENT DOCUMENTS

| AT | 395 781 B | 12/1988 |
| DE | 27 47 356 A1 | 4/1979 |
| DE | 31 48 600 A1 | 7/1983 |
| EP | 0 031 942 A1 | 7/1981 |
| JP | 60-093261 | 5/1985 |

* cited by examiner

*Primary Examiner* — Melvin Jones  
(74) *Attorney, Agent, or Firm* — Mark FitzGerald (57) ABSTRACT A water sump structure (1) is provided. A channel, trough, trench or the like is formed as or provided with an impermeable member (7) for trapping water. One or more heat exchange pipes (6) for carrying a heat exchange fluid are located, in use, so as to pass through water trapped by the impermeable member thereby forming a heat exchange water sump structure.

23 Claims, 7 Drawing Sheets

WATER SUMP STRUCTURE

The present invention relates generally to a water sump structure and particularly, although not exclusively, to a water sump structure comprising a heat exchange structure intended for exchanging heat within an aqueous environment. One particular application of such a heat exchange structure is as part of a heat pump system, in which the structure is used to provide cooling or heating, for example to a building, depending on the direction of operation of the heat pump.

It is known to form deep vertical bores in the ground to house pipes bearing a heat exchange fluid for bringing the fluid into thermal contact with the ground, which can then act either as a heat source or a heat sink. The deep vertical bores are particularly aimed at seeking to contact the water table so that water surrounding the pipes can be used as a secondary heat exchange liquid to ensure good thermal contact between the heat exchange liquid within the pipes and the ground. As an alternative it is also known to lay pipes horizontally in ponds or lakes, or directly into the ground where the water table is high enough to allow contact with water.

The known systems therefore have the limitation that they must rely on the natural presence of water, such as the water table or a lake, to function. In the case of a horizontally laid pipe system relying on the presence of the water table, if the water table dropped below the level of the pipes then the heat exchange efficiency would be dramatically reduced. Digging deep horizontal trenches to accommodate pipes to overcome this problem is not practical.

The present invention seeks to address the problems with the known heat exchange structures.

According to a first aspect of the present invention there is provided a water sump structure comprising: a substantially water impermeably member for causing water to become trapped; and one or more heat exchanging pipes for carrying a heat exchange fluid and located, in use, so as to pass through water trapped by the impermeable member.

The present invention creates an enhanced heat exchange zone in which water collects and through which heat exchange fluid is directed in heat exchange pipe.

The present invention is based on the desire to be able to establish a heat exchange relationship involving water regardless of the level of the water table or the natural presence of a body of water. Accordingly a cistern-, reservoir- or sump-like arrangement is provided which collects and holds water, effectively creating an artificial water table for the heat exchange pipes to pass through. This would allow horizontally laid pipes to be used even in circumstances where no contact with the water table is available.

The structure may be located in a subterranean environment. The heat exchange could then occur within an environment of subterranean structures, saturated with collected water. Accordingly the channel may be a subterranean channel incorporating buried heat exchange pipes.

A structure positioned outdoors is able to take advantage of rain fall or other precipitation to collect water for use in enhancing the heat exchange process. However, in order to prepare the structure for immediate use it may be artificially filled with water. Subsequently the structure may be kept full naturally by collecting rain water from above.

The structure may comprise a channel through which the or each heat exchange pipe passes. The channel may comprise the water impermeable member. For example, the channel may comprise a ground trench which is excavated and then has its sidewalls compacted so as to be substantially impermeable to water.

The impermeable member may comprise a layer of water impermeable material. The layer may line at least part of a channel. For example, the layer may be laid at the bottom of a channel or may line the whole of the channel wall.

In order for the structure to function efficiently the member must be substantially impermeable to water.

The structure may include a substantially water impermeable trough member which comprises the channel or forms a liner therefor. Accordingly the trough member may simply rest on a surface, or may line a pre-formed channel.

The trough member may be formed from a material having a high thermal conductivity so that the channel does not impede the heat exchange process.

The water impermeable member may comprise a rigid plastic trough or alternatively may comprise a flexible plastic liner.

The water impermeable member may be an open trough-like structure so as to receive water but closed at each end to hold trapped water indefinitely rather than just serving as a temporary obstacle.

The structure may contain only water; or for subterranean heat exchange pipes a channel may simply be filled in with earth once the pipes have been laid.

The structure may contain primary particulate material, such as crushed rock or other aggregate in the form of a sub-base, which acts as ballast and allows water to permeate easily from above. In addition, the particulate material may allow for more efficient transfer of heat than just replaced earth.

The primary particulate material may be overlaid by a water permeable layer of secondary particulate material, such as crushed rock to increase the permeability of the area above the impermeable member and maximise water collection.

The size of the secondary particles may be greater than the size of the primary particles.

A water permeable wear surface may be formed over the water permeable member. The wear surface of the paving system may be permeable tarmac having passages through it or individual blocks, typically of concrete or other such material, which have passages either within them or between them to allow water to pass through rather than being retained on the surface. The wear surface may be formed directly over the water permeable member, whereas in other embodiments the surface may be formed over the water permeable layer of secondary particulate material if present. The permeable wear surface may comprise a pavement structure. Permeable pavement and supporting sub-base designs are already known and would be particularly suitable for use in conjunction with the heat exchange structure of the present invention.

A particulate sub-base layer may be made from non-friable particulate material which, when compacted, retains enough voids between the particles to hold water up to a given percentage. A sub-base with an underlying impermeable membrane can form in effect a subterranean cistern capable of holding a large quantity of water. If the sub-grade is suitable the sub-base may be laid directly on it without an impermeable barrier so that water collecting in the sub-base can infiltrate gradually into the sub-grade.

In order to increase the heat exchanging capacity of the structure there may be provided a plurality of heat exchange pipes. In order to maximise the efficiency of heat exchange the plurality of heat exchange pipes may be mutually spaced. The spacing of the pipes may be achieved by the particulate material. The material can act as a framework or separation grid to hold the pipes away from each other so that each can be in separate and maximum thermal contact with the surrounding water which fills the channel in use of the system.

In a subterranean system, whilst in theory the depth of the pipes can be at any distance below the surface of the ground, in one embodiment the pipes are buried approximately 1.5 m below the surface, as this requires the excavation of only a shallow trench to accommodate or form a channel.

In order to improve the efficiency of water collection there may be provided one or more diverter members positioned for directing water to be trapped by the impermeable member. In one embodiment the directing means comprise sheets of water impermeable membrane arranged to funnel water into a channel. In a subterranean embodiment the diverting members serve to increase the area of earth above the channel from which water can be collected and stored.

The structure may further comprise a unidirectionally water permeable layer positioned to prevent evaporation of trapped water, for example at ground level above a channel. The water permeable layer would allow water to pass into the ground above the channel but prevent evaporation thereafter so as to maximise the amount of water collected and retained in the channel.

The unidirectionally water permeable layer may comprise a fabric such as a geotextile or membrane, for example Imbitex.

According to a second aspect of the present invention there is provided a water sump structure comprising: an excavated ground trench in-filled with primary particulate material for holding water; and one or more heat exchange pipes carrying heat exchange fluid and embedded in the particulate material.

The structure is formed by excavating the ground trench and in-filling with a material which is more suitable for serving as a water sump than the earth which is removed. The pipe/s are laid in the particulate material so that when water collects in the trench the pipes are surrounded by water, which improves the efficiency of heat transfer to/from the surrounding subterranean structure of the body of particulate material.

The ground trench may be, or may be adapted to be, substantially water impermeable so that water can be retained indefinitely in the particulate material. Accordingly the trench may be lined with a water impermeable liner member such as a rigid trough or a flexible membrane or the wall of the trench may be compacted or otherwise treated to improve its ability to retain water.

According to a further aspect there is provided a method of forming a water sump structure, comprising the steps of: providing a substantially water impermeable member for trapping water to form an enhanced heat exchange zone; providing one or more heat exchange pipes for carrying a heat exchange fluid; and passing the or each heat exchange pipe through the enhanced heat exchange zone formed by the water impermeable member in use.

The method may include the step of forming a channel within which the enhanced heat exchange zone is created and through which the or each heat exchange pipe is passed.

The channel may comprise the water impermeable member. For example the channel may comprise a preformed trough. Alternatively the impermeable member may comprise a layer of water impermeable material which may line at least part of a channel.

Accordingly, formation of the structure may involve excavating a shallow area to form an elongate trench closed at both ends which is, or is modified to be, impermeable to water by any convenient means such as by compaction of the surrounding earth or by providing a liner, coating or a rigid trough-like member.

The method may further comprise a step of providing primary particulate material through which the pipe/s are passed. This may be followed by the step of overlaying the primary particulate material with a water permeable layer of secondary particulate material. The secondary particulate material may be of a greater average particulate size than the primary material.

The method may further comprise the step of forming a water permeable wear surface over the water permeable layer of particulate material. In one embodiment this step comprises the installation of a permeable pavement system which allows for the efficient transfer of water down into the channel. The heat exchange structure then comprises a permeable pavement system with a permeable sub-base formed over one or more water impermeable trenches.

The method may further comprise the step of positioning one or more diverter members for directing water to become trapped around the heat exchange pipe/s in use. During the construction of the heat exchange structure water impermeable diverter members may be installed to funnel water into a channel.

The method may further comprise the step of providing a unidirectionally water permeable membrane layer at ground level so that water can pass into the heat exchange structure but is prevented from evaporating whilst it remains close to the surface.

According to a further aspect of the present invention there is provided a heat pump system incorporating a water sump structure as described herein.

According to a further aspect of the present invention there is provided a building which is heated/cooled by a heat pump system as described herein.

According to a further aspect of the present invention there is provided a subterranean water sump structure comprising: a ground trench; a substantially water impermeable member for causing water to become trapped in the trench; in which a permeable wear surface is formed above the trench.

In other words, the water sump forms part of a permeable wear surface arrangement and water trapped and stored by the sump could be used for a variety of purposes including irrigation, domestic use and as part of a heat pump system.

The permeable wear surface may comprise a pavement structure.

One or more heat exchange pipes for carrying a heat exchange fluid may be located, in use, so as to pass through water trapped by the impermeable member. The trapped water in the sump can then form part of a heat exchange circuit, for example forming part of a heat pump system.

The impermeable member may comprise a flexible membrane. Alternatively the impermeable member may comprise a rigid trough member.

The structure may further comprise primary particulate material. The particulate material may comprise crushed rock. The primary particulate material may be overlaid by a water permeable layer of secondary particulate material. The secondary particulate material may comprise crushed rock. The size of the secondary particles may be greater than the size of the primary particles.

There may be provided one or more diverter members positioned so as to direct water to be trapped by the impermeable membrane in use.

The or each directing member may comprise a sheet of water impermeable membrane arranged to funnel water into the channel.

The structure may further comprise a uni-directionally water impermeable layer positioned to prevent evaporation of trapped water. The uni-directionally water permeable layer may comprise a fabric.

The present invention will now be more particularly described, by way of example, with reference to the accompanying drawings, in which like feature are identified by like reference numerals and in which.

Figure 1:
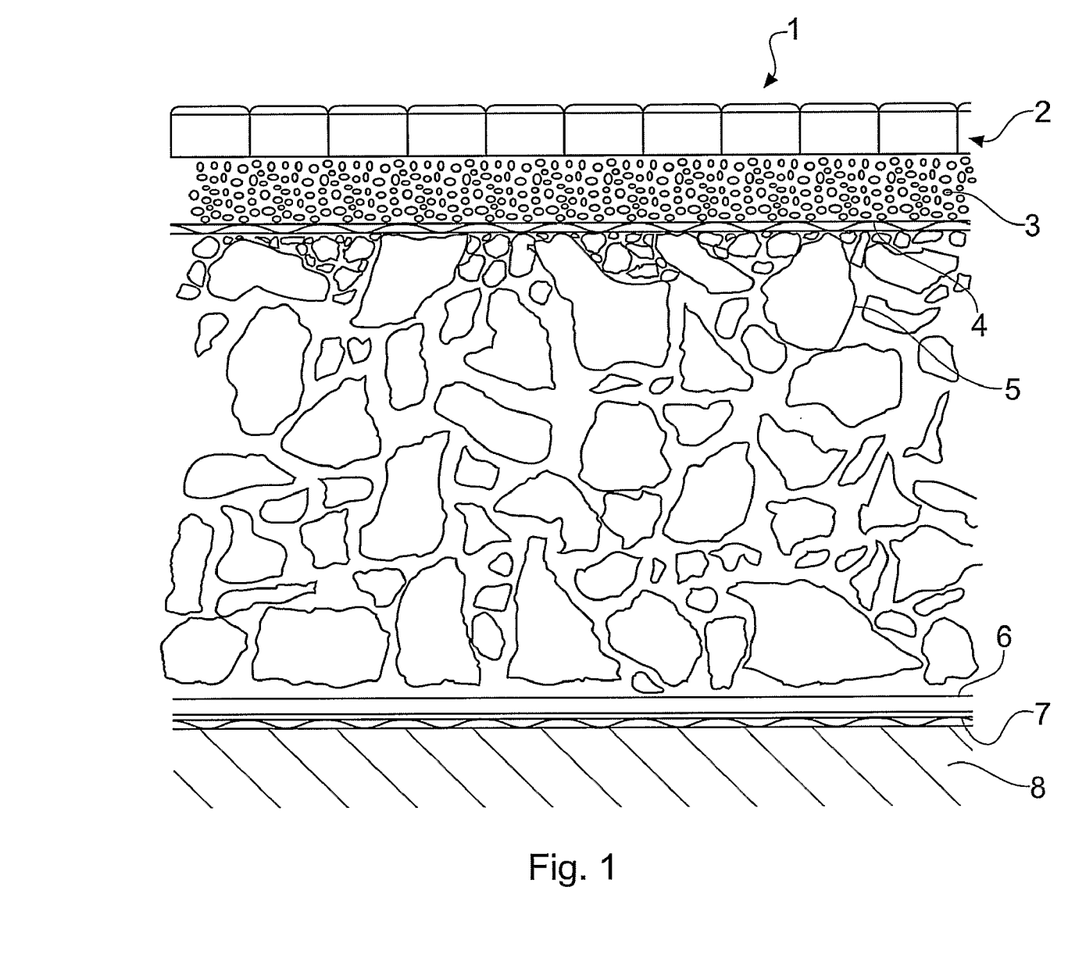
FIG. 1 is a diagrammatic section of a water sump structure formed as a heat exchange structure according to a first aspect of the present invention.

Referring first to FIG. 1 ground-based heat exchanging water sump structure generally indicated 1 comprises an upper layer of blocks 2 which may be of the type described in the Applicant's International Patent Application published under number WO 99/64680 the disclosure of which is incorporated herein by reference, which are substantially impermeable, but have grooves or channels in one or more lateral edges thereof to provide drainage passageways from the top to the bottom. In addition to an upper bevel which can be seen in the drawings, part of the upper side wall is tapered along the entirely of the edge between the upper surface and the lateral surface to allow a small degree of flexing of the overall surface by movement of the blocks upon the passage of heavy traffic. This helps to avoid spalling, and the channels provided by adjacent tapered surfaces also encourage the drainage of rainwater from the surface through the drainage channels into the underlying layers to be described in more detail below.

The blocks 2 are laid on an intermediate layer or bedding course 3 of fine particulate or granular material of a size in the region of 2 mm-10 mm, preferably up to 5 mm, which in turn is laid to tolerance on a unidirectionally water permeable geotextile membrane 4 itself overlying a sub-base layer generally indicated 15.

The bedding layer 3 is raked and levelled before the blocks 2 are laid on it, and blocks 2 are laid directly on the bedding layer 3 with no grouting or other filling (such as sand) either between themselves and the layer 3 or between each other so that there are no fine materials to wash down into the lower layers of the structure when rainfall infiltrates the passages between the blocks 2. After laying the blocks 2 a vibrator is passed over the entire surface to settle the blocks 2 and ensure they all lie to a common surface. Before or after this is done the block-paved surface may be dressed with a thin layer of fine clean stone in a size range about 2 mm-3 mm. These stones are then brushed into the interstices and help to lock the blocks 2 in position against relative movement without clogging the passages through which the water drains into the underlying layer 5.

The sub-base layer 5 is composed of crushed gravel, rock, concrete or other hard insoluble particulate material having well-defined edges. It must be sound, clean and non-friable and free from clay or other fine particulate material. This property allows the compaction of a layer typically in region of 350 mm to 400 mm thick, to a state in which it is capable of bearing the load of vehicular traffic such as motor cars, trucks and lorries. For this purpose the material must be non-plastic when tested in accordance with BS1377 Test 4. The material must also have a minimum 10% fines value of 150K/n when tested in accordance with BS812 Part 3. In conducting such tests the samples must not be oven dried and should be soaked in water at room temperature for 48 hours before the test is conducted. This ensures that there are no variations between the performance of the material when wet and when dry as it must pass the test when effectively saturated.

The dimensions of the particles in the sub-base layer 5 may be up to 100 mm with up to 60% of the material being less than 37.5 mm and not more than 40% of the material being greater than 37.5 mm. Up to 20% of the material may be less than 20 mm with only 5% being less than 10 mm. This ensure that the material is permeable and, when compacted, nevertheless has a large proportion of void space between the particles. Typically 30% of the volume occupied by the layer 5 will be void space which is available for receiving water when the heat exchange structure 1 is in use.

The overall thickness of the sub-base layer 5 may typically be in the region of 350 mm although greater or lesser thickness may be used if circumstances permit or dictate.

Beneath the sub-base 5 is a water impermeable geotextile layer 7 which separates the sub-base 5 from the sub-grade 8 which preferably should have a CBR (California Bearing Ratio) of at least 15%.

A heat exchange pipe 6 is laid on top of the water impermeable layer 7 under the sub-base layer 5. The heat exchange pipe 6 carries heat exchange fluid and forms part of a heat pump system (not shown), forming a closed loop which circulates heat exchange fluid to collect or dissipate heat.

Rainfall or other precipitation (when melted) falling on the upper surface of the blocks 2 can infiltrate through the wear layer and the intermediate or bedding layer 3 which acts to trap many of the pollutants carried by the water. The effective storage volume of the sub-base layer 5 allows the water to collect in this region, and then be retained or diffused gradually through the sub-grade 18 which, in this embodiment, is assumed to be porous or to have sufficient faults to allow the water to permeate either through the ground downwardly or laterally through the edges of the storage region thus formed. The nature of the sub-base material 5 is such that, even when drained, the particles retain some moisture in pockets which ensures a humid atmosphere suitable for heat exchange.

Figure 2:
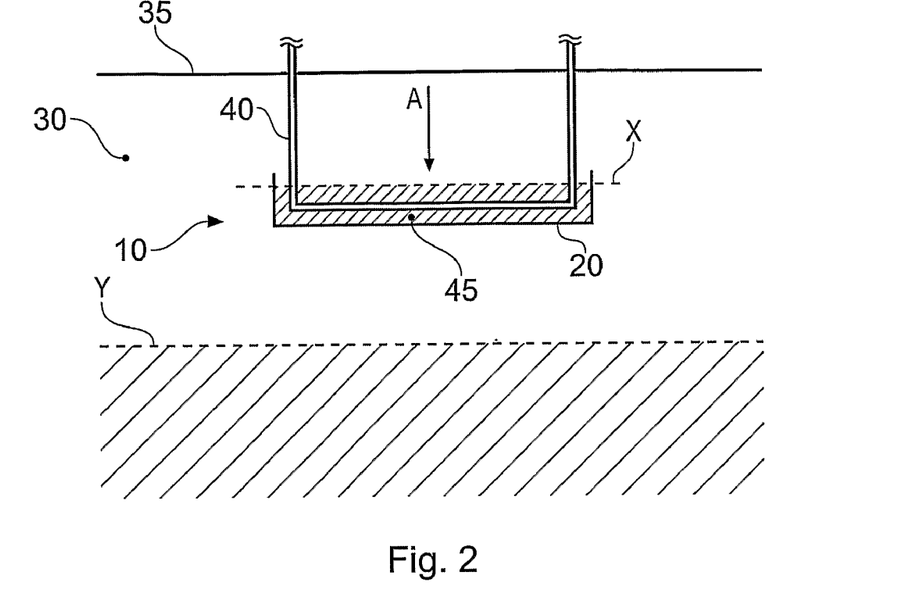
FIG. 2 is a diagrammatic section of a structure formed according to a further embodiment of the first aspect of the present invention.

Referring now to FIG. 2 there is shown a heat exchange structure generally indicated 10. The structure 10 is formed from an elongate channel 20 closed at each end and positioned horizontally in the ground 30. An elongate heat exchange pipe 40 for carrying a heat exchange fluid (not shown), such as water, extends from the surface 35 down to the channel 20 and then passes coaxially along the length of the channel before returning to the surface 35.

The channel 20 is formed from a water impermeable material, such as a plastics material, and thus water entering the ground above the channel 20 drains into the channel 20 as indicated by the arrow A. Because the channel 20 is impermeable to water it acts like a sump and is filled with water 45. This means that the section of the pipe 40 passing through the channel 20 is surrounded by water. The structure 10 is buried in the ground 30 so that the channel 20 is filled with earth 30 and the pipe 40 passes through earth saturated with water within the channel. Accordingly, heat transfer between the heat exchange fluid within the pipe 40 and the earth surrounding the pipe 40 is enhanced, because the water 45 within the channel serves as a secondary heat exchange fluid.

Because the channel 20 is filled with water 45 this creates an artificial water table with a level X which is at a much reduced depth compared to the natural water table level Y.

The heat exchange pipe 40 can form part of any system requiring its heat exchanging properties, such as a heat pump.

Figure 3:
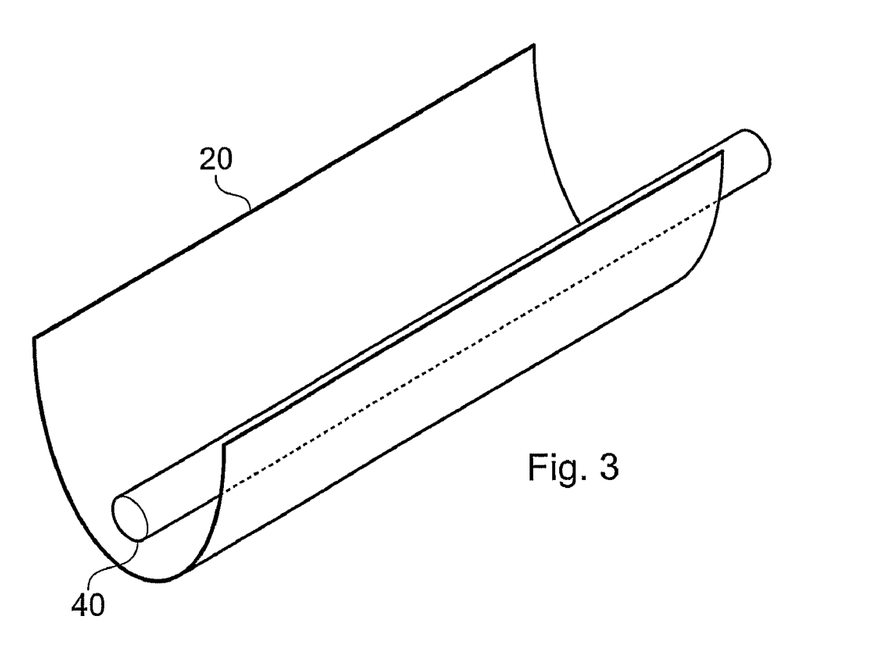
FIG. 3 is a diagrammatic perspective view of part of the structure of FIG. 2.

FIG. 3 illustrates the form of the channel, which is shown to comprise a generally U-shape trough which can be easily buried in the ground in an excavated trench. The pipe 40 is shown passing longitudinally through the channel 20.

Figure 4:
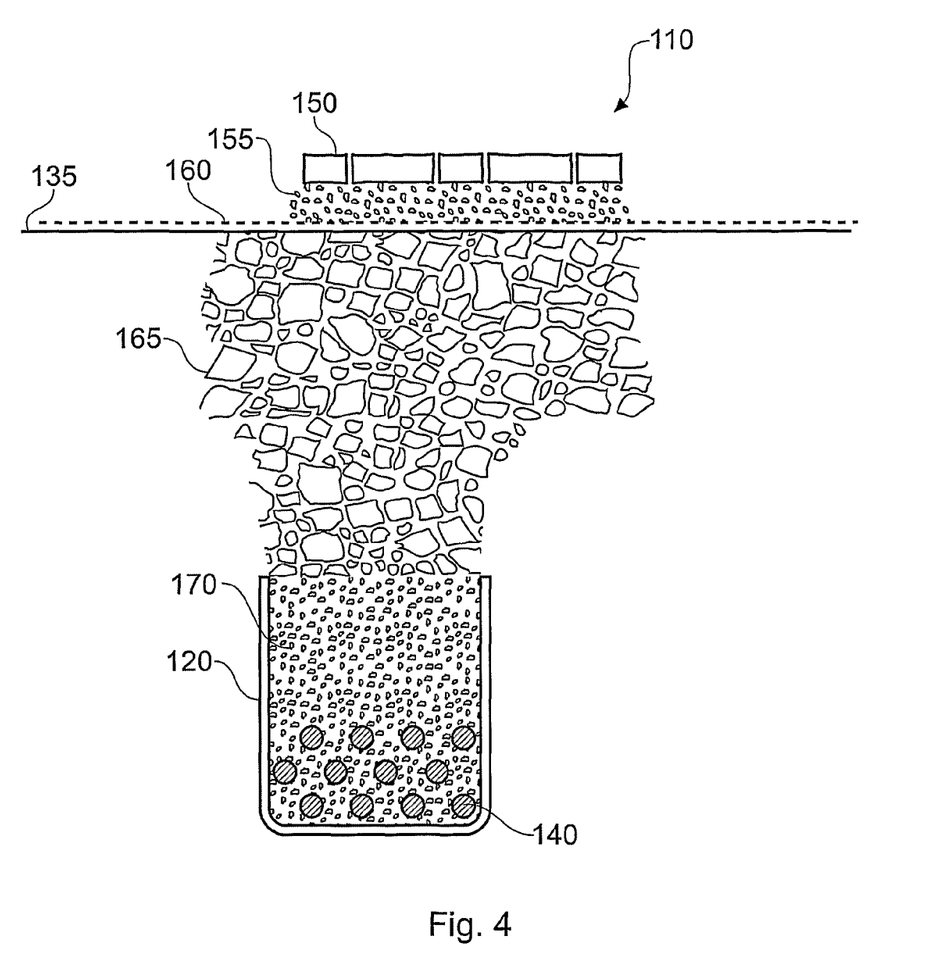
FIG. 4 is a diagrammatic section of a heat exchange structure formed according to a further embodiment of the first aspect.

Referring now to FIG. 4 there is shown an alternative subterranean heat exchange structure generally indicated 110. Above ground level 135 is a water permeable wear surface 150 comprising a pavement system made up of a plurality of blocks such as the Aquaflow® blocks available from Formpave Ltd. The blocks rest on a bed of stones 155 which have an average size of approximately 6 mm.

The stones 155 are laid on a membrane 160 which allows water to pass through from above but will not thereafter allow water to pass back, so that water which enters the ground through the membrane 160 cannot evaporate back out of the ground. The membrane 160 may comprise any suitable geotextile or liner product and is laid directly onto the ground surface 135.

Beneath ground level 135 is a water permeable layer of crushed rock known as a sub-base. The particles size of the layer 165 is greater than that of the stone bed 155.

Beneath the layer 165 is positioned a channel 120 of the same general type of that described in relation to FIGS. 1 and 2 in that it is a generally U-shape plastic box, in this embodiment being approximately 5 m long, 600 mm high and 250 mm wide.

In this embodiment 12 elongate heat exchange pipes 140 pass through the channel and the channel is filled with stones 170 which are of the same general type as the stones used for the stone bed 155. The stones 170 serve as ballast in the channel 140 and also serve to separate and hold the pipes 140 mutually spaced from each other.

Water, usually in the form of rainwater, will enter the structure via and permeable pavement system 150 and then pass through the successive stone layers 155, 165, 170 before becoming trapped within the channel 120 and surrounding the pipes 140. In use of the system the heat exchange fluid carried within the pipes 140 can transfer heat to or from the surrounding subterranean structure of the stone layer 170 and then to the surrounding earth with increased efficiency because the pipes 140 are immersed in water (not shown).

This structure 110 could be formed as follows. First a trench (not shown) is excavated and the channel 120 is laid into the trench. The pipes 140 are laid into the channel and the stone layer 170 is filled into the channel around the pipes 140 separating them from each other. The layer 165 is then added to the trench above the channel 120. The permeable membrane 160 is laid across the mouth of the trench above the layer 165. The stone bed 155 is then poured onto the membrane 160 and the pavement blocks 150 are laid into the bed 155.

Figure 5:
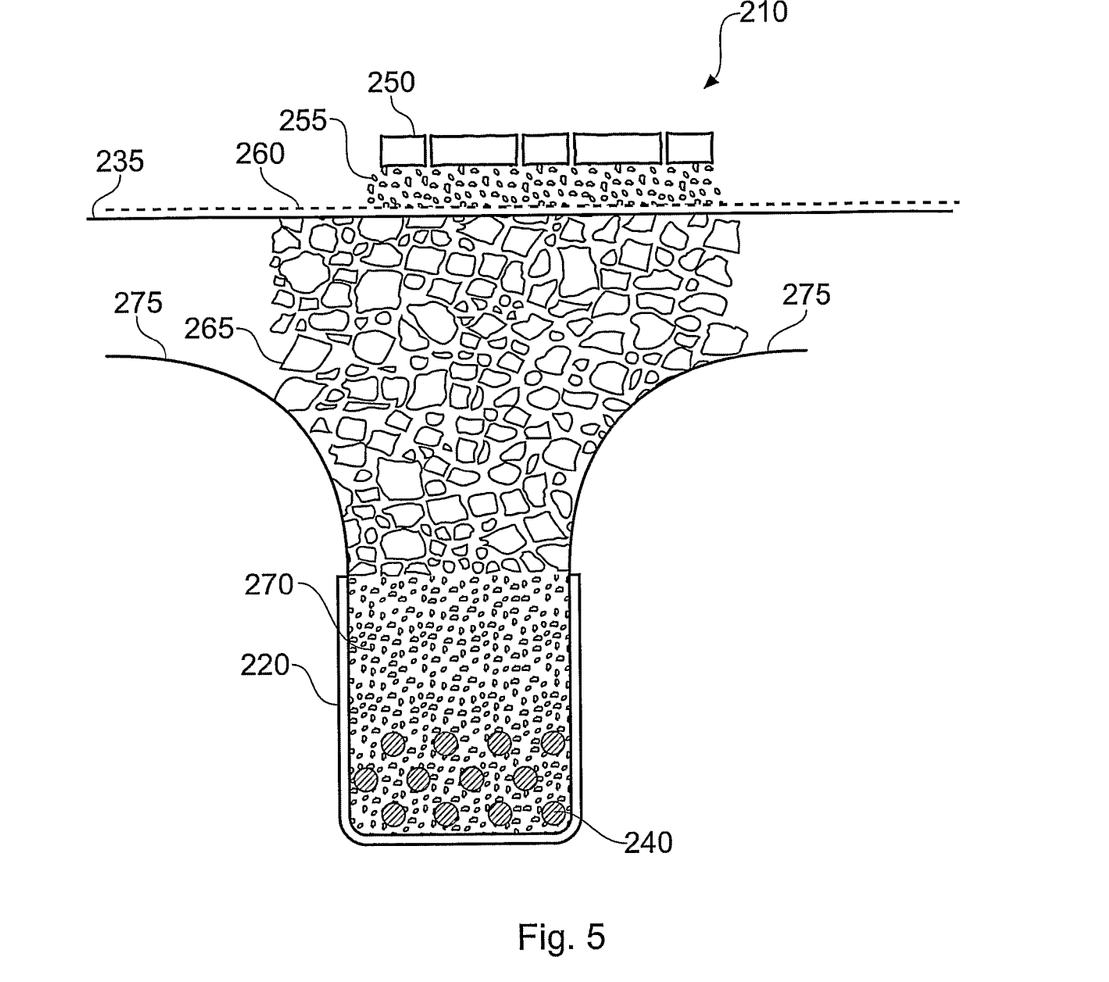
FIG. 5 is a structure formed according to a still further embodiment of the first aspect.

Referring now to FIG. 5 there is shown an alternative heat exchange structure generally indicated 210. The basis for the structure 210 is exactly the same as that for the structure 110 of FIG. 4 and like features are indicated with light like reference numerals.

In this embodiment the structure 210 additionally includes diverter members 275 in the form of water impermeable membranes formed into a funnel arrangement towards the mouth of the channel 220 to maximise the amount of water collected from the ground above the channel 220. The diverters 275 may be connected to the channel 220 by any convenient means such as sealing tape (not shown).

Figure 6:
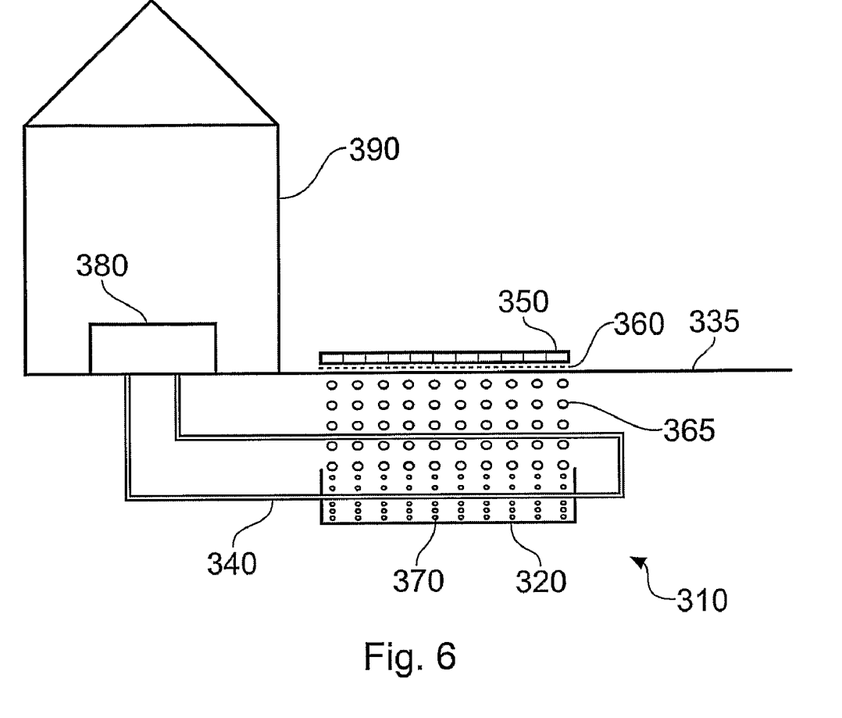
FIG. 6 is a diagrammatic section of a heat pump system incorporating a heat exchange water pump structure according to the present invention.

Referring now to FIG. 6 there is shown a heat exchange structure generally indicated 310 forming part of a heat pump system generally indicated 380 used for the heating or cooling of a building 390. The heat pump system 380 uses the heat exchange pipe 340 of the heat exchange structure 310 to provide heating or cooling of the building 390. Heat exchange fluid is circulated around the pipe 340 which forms a closed loop and interacts with heat exchange apparatus within the heat pump 380 to provide the heating or cooling effect.

The channel 320 causes water to become absorbed by and trapped in the layer 370. In addition, the layer 365 is saturated with water above the channel 320 as it drains downwards. Accordingly the return leg of the pipe 340 also passes through saturated particulate material.

Figure 7:
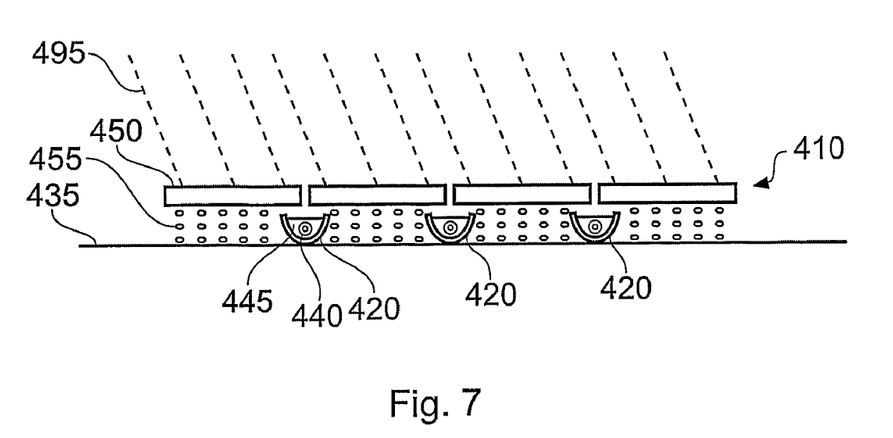
FIG. 7 is a diagrammatic section of a heat exchange water sump structure formed according to a further embodiment of the first aspect.

Referring now to FIG. 7 there is shown an alternative heat exchange structure 410. The structure 410 comprises channels 420 arranged on the ground 435 and accommodating heat exchange pipes 440. The channels 420 are supported in a matrix of stones 455 on top of which are laid slabs 450 forming a permeable wear surface in the form of a pavement. The open mouths of the channels 420 allow rain water 495 which hits the pavement slabs 450 to drain into the channel and submerge the pipes 440. In this embodiment heat is transferred from heat transfer fluid in the pipes 440 into the water 445 in the channels, and then into the stone layer 455 and the ground 435 through the channels 420.

Figure 8:
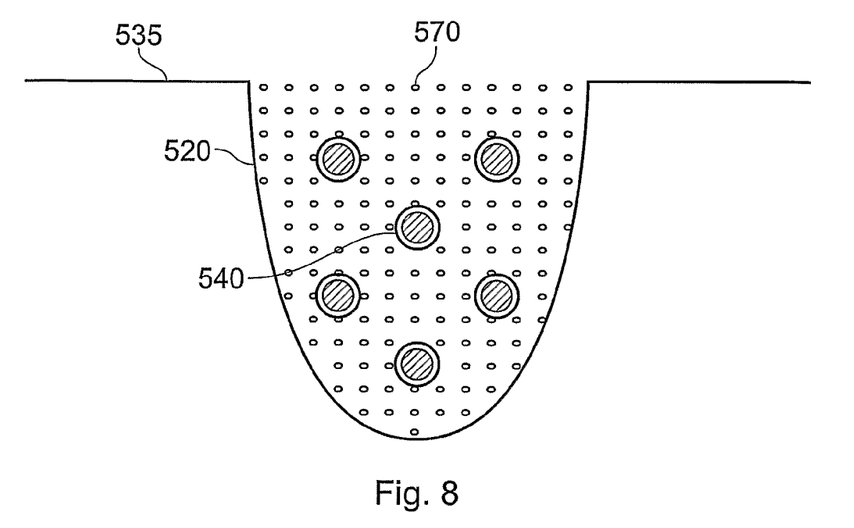
FIG. 8 is a diagrammatic section of a heat exchange water sump structure according to a second aspect of the present invention.

Referring now to FIG. 8 there is shown a heat exchange structure 510 according to a second aspect of the present invention. A trench 520 is shown which has been excavated from the ground 535. Five heat exchange pipes 540 are laid horizontally to run longitudinally through the trench 520 and the trench 520 is in-filled with aggregate material 570. The pipes 540 are embedded in the material 570 which supports them and holds them spaced apart.

Water is infused into the material 570 either artificially or through precipitation. The water surrounds the pipes 540 and serves as a secondary heat transfer fluid to enhance heat transfer to/from heat transfer fluid carried in the pipes 540 from/to the surrounding material 570.

Figure 9:
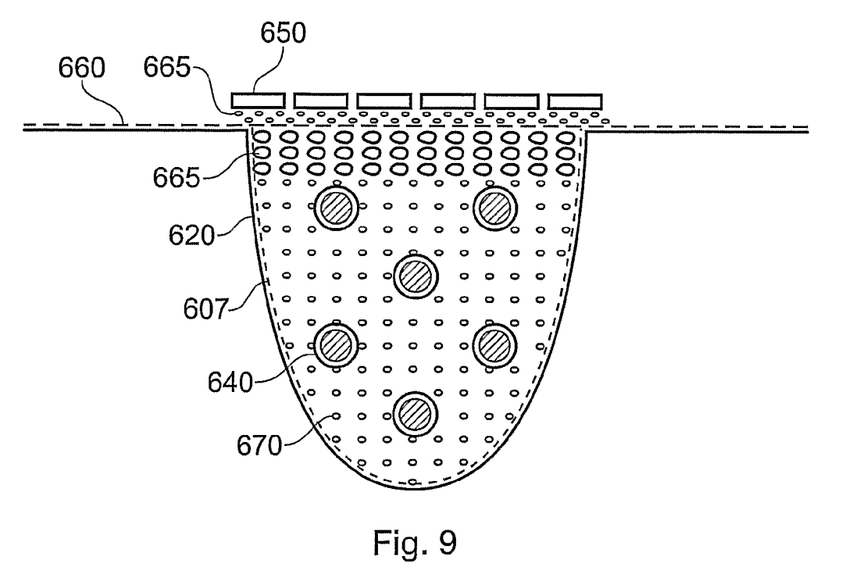
FIG. 9 is a diagrammatic section of a heat exchange structure formed according to an alternative embodiment of the second aspect.

Referring now to FIG. 9 there is shown an alternative embodiment similar to FIG. 8 in that a trench 620 is formed and in-filled with aggregate material 670 with heat exchange pipes 640 running through.

In this embodiment the particulate material 670 is overlaid by a layer of secondary particulate material 665. The material 665 is overlaid by a undirectionally water permeable membrane 660 which is in turn overlaid by a further layer of particulate material 655 forming a base for a block paving arrangement 650. In addition, the wall of the trench 620 is lined with a water impermeable membrane 607 which allows water trapped in the trench 620 to be retained indefinitely.

Figure 10:
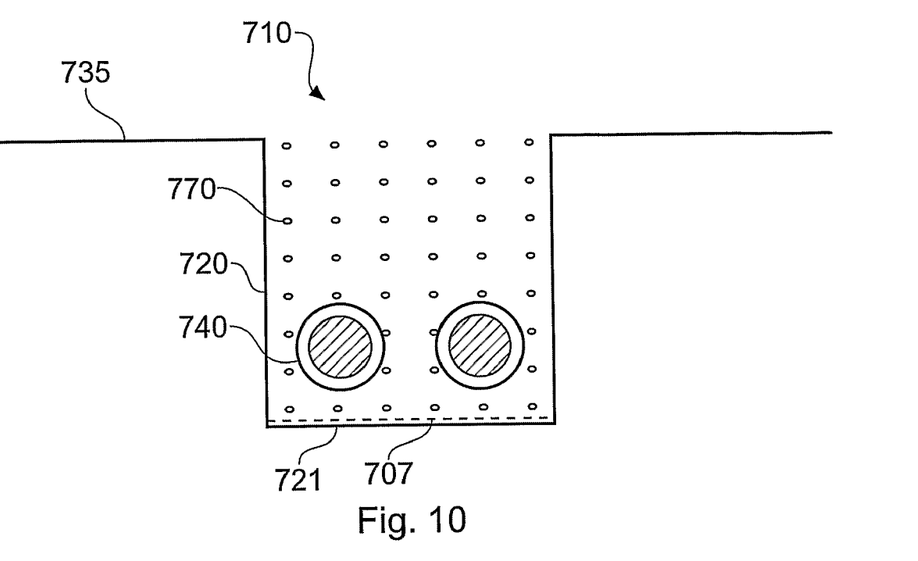
FIG. 10 is a diagrammatic section of a heat exchange water sump structure formed according to a further embodiment of the second aspect.

Referring now to FIG. 10 there is shown a structure 710 according to an alternative embodiment. A trench 720 includes a base 721 lined with a water impermeable membrane 707. Two heat exchange pipes 740 run longitudinally through the trench 720. The pipes 740 are placed to flow a sinuous path (not shown) to increase the amount of pipe over a give length of trench. The pipes are supported in a layer of aggregate material 770 which is poured into the trench 720.

Even though the entire wall of the trench 720 is not lined with water impermeable material the material 770 will still trap water, although there will be some lost laterally.

Figure 11:
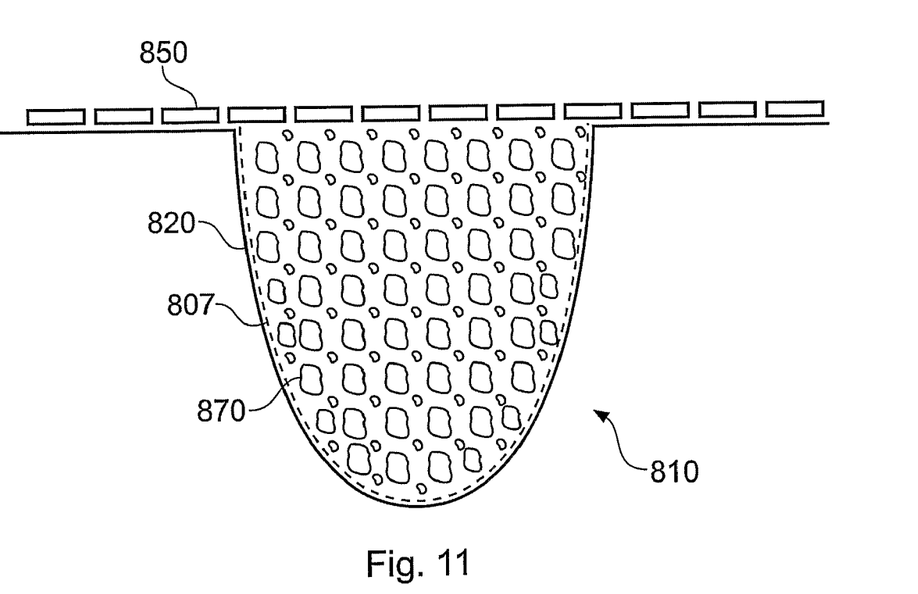
FIG. 11 is a diagrammatic section of a water sump structure formed according to an alternative aspect of the present invention.

Referring now to FIG. 11 there is shown a water sump structure 810 according to an alternative aspect of the present invention. The structure 810 comprises a subterranean ground trench 820 lined with a water impermeable membrane 807. The trench 820 is filled with particulate material 870 which substitutes earth excavated to form the ground trench 820.

The trench 820 is overlaid by a permeable wear surface in the form of a pavement structure 850.

In use water flows through the structure 850 into the material 870 where it becomes trapped by the membrane 807. Thereafter the trapped water could be used for any suitable purpose such as for heat exchange, irrigation or domestic use.

In an alternative embodiment (not shown) a uni-directionally water permeable membrane may overlay the trench to prevent water loss through evaporation.

The invention claimed is:

1. A subterranean water sump structure comprising:
   a substantially water impermeable member which is adapted, in use, to collect rainfall or other precipitation from above the ground and trap the water below the ground;
   at least one heat exchange pipe for carrying a heat exchange fluid and located, in use, so as to pass through water trapped by the impermeable member,
   primary particulate material through which said at least one heat exchange pipe passes, said primary particulate material having primary particles and being overlaid by a water permeable layer of secondary particulate material having secondary particles; and
   wherein the size of the secondary particles is greater than the size of the primary particles.

2. The structure as claimed in claim 1, in which the structure further comprises a ground trench lined by the water impermeable member.

3. The structure as claimed in claim 1, in which the impermeable member comprises a flexible membrane.

4. The structure as claimed in claim 1, in which the impermeable member comprises a rigid trough member.

5. The structure as claimed in claim 4, in which the trough member is formed from a material having a high thermal conductivity.

6. The structure as claimed in claim 1, in which the primary particulate material comprises crushed rock.

7. The structure as claimed in claim 1, in which the secondary particulate material comprises crushed rock.

8. The structure as claimed in claim 1, in which a water permeable wear surface is formed above the water impermeable member.

9. The structure as claimed in claim 1, in which a water permeable wear surface is formed over the layer of secondary particulate material.

10. The structure as claimed in claim 8, in which the permeable wear surface comprises a pavement structure.

11. The structure as claimed in claim 1, in which the at least one heat exchange pipe comprises a plurality of heat exchange pipes.

12. The structure as claimed in claim 11, in which the pipes are mutually spaced.

13. The structure as claimed in claim 1, in which the at least one heat exchange pipe is buried approximately 1.5 meters below the surface of the ground in use.

14. The structure as claimed in claim 1, further comprising at least one diverter member positioned so as direct water to be trapped by the impermeable member in use.

15. The structure as claimed in claim 14, in which the at least one diverting member comprises a sheet of water impermeable membrane arranged to funnel water into the structure.

16. The structure as claimed in claim 1, further comprising a unidirectionally water permeable layer positioned to prevent evaporation of trapped water.

17. The structure as claimed in claim 16, in which the unidirectionally water permeable layer comprises a fabric.

18. A heat pump system incorporating a structure of claim 1.

19. A building which is climate-controlled by a heat pump system according to claim 18.

20. A method of forming a subterranean water sump structure, comprising the steps of:
   providing a substantially water impermeable member for collecting rainfall or other precipitation from above the ground and trapping it below the ground;
   providing at least one heat exchange pipe for carrying a heat exchange fluid;
   passing the at least one heat exchange pipe through an area in which water collected, in use, is trapped by the impermeable member
   filling the structure through which the at least one heat exchange pipe passes with primary particulate material having primary particles; and
   overlaying said primary particulate material with a water permeable layer of secondary particulate material having secondary particles, wherein the size of the secondary particles is greater than the size of the primary particles.

21. The method as claimed in claim 20, in which the structure is formed by excavating a ground trench.

22. The method as claimed in claim 20, further comprising the step of positioning one or more diverter members for directing water to be trapped by the impermeable member in use.

23. A method as claimed in 20, further comprising the step of providing a unidirectionally water permeable membrane to prevent evaporation of trapped water.

* * * * *